US010836845B2

(12) United States Patent
Balducci et al.

(10) Patent No.: US 10,836,845 B2
(45) Date of Patent: Nov. 17, 2020

(54) POLYETHYLENE POWDER, PROCESS FOR ITS PREPARATION AND ITS USE FOR ROTOMOLDING

(71) Applicant: Versalis S.P.A., San Donato Milanese (IT)

(72) Inventors: Daniele Balducci, San Giorgio Mantovano (IT); Paolo Mariani, Milan (IT)

(73) Assignee: Versalis S.P.A., San Donato Milanese (IT)

( * ) Notice: Subject to any disclaimer, the term of this patent is extended or adjusted under 35 U.S.C. 154(b) by 0 days.

(21) Appl. No.: 15/754,196

(22) PCT Filed: Aug. 25, 2016

(86) PCT No.: PCT/IB2016/055067
§ 371 (c)(1),
(2) Date: Feb. 21, 2018

(87) PCT Pub. No.: WO2017/033142
PCT Pub. Date: Mar. 2, 2017

(65) Prior Publication Data
US 2018/0237557 A1  Aug. 23, 2018

(30) Foreign Application Priority Data
Aug. 26, 2015 (IT) .................... 102015000046637

(51) Int. Cl.
| | | |
|---|---|---|
| *C08F 10/02* | (2006.01) | |
| *C08F 2/34* | (2006.01) | |
| *C08K 5/00* | (2006.01) | |
| *C08K 5/01* | (2006.01) | |
| *C08K 5/13* | (2006.01) | |
| *C08K 5/14* | (2006.01) | |
| *C08K 5/17* | (2006.01) | |
| *C08K 5/52* | (2006.01) | |
| *C08K 5/521* | (2006.01) | |
| *C08K 5/524* | (2006.01) | |
| *C08K 5/56* | (2006.01) | |
| *C08L 23/06* | (2006.01) | |
| *C08K 5/372* | (2006.01) | |
| *C08K 5/3492* | (2006.01) | |
| *C08K 5/5393* | (2006.01) | |

(52) U.S. Cl.
CPC .............. *C08F 10/02* (2013.01); *C08F 2/34* (2013.01); *C08K 5/005* (2013.01); *C08K 5/0025* (2013.01); *C08K 5/01* (2013.01); *C08K 5/13* (2013.01); *C08K 5/14* (2013.01); *C08K 5/17* (2013.01); *C08K 5/3492* (2013.01); *C08K 5/372* (2013.01); *C08K 5/52* (2013.01); *C08K 5/521* (2013.01); *C08K 5/524* (2013.01); *C08K 5/5393* (2013.01); *C08K 5/56* (2013.01); *C08L 23/06* (2013.01); *C08F 2500/07* (2013.01); *C08F 2500/12* (2013.01); *C08F 2500/18* (2013.01); *C08F 2500/24* (2013.01); *C08L 2207/062* (2013.01)

(58) Field of Classification Search
CPC ........ C08F 10/02; C08F 2/34; C08F 2500/07; C08F 2500/12; C08F 2500/24; C08K 5/0025; C08K 5/005; C08K 5/01; C08K 5/13; C08K 5/14; C08K 5/17; C08K 5/3492; C08K 5/372; C08K 5/52; C08K 5/521; C08K 5/524; C08K 5/5393; C08K 5/56; C08L 23/06; C08L 2207/062
USPC .......................................................... 524/91
See application file for complete search history.

(56) References Cited

U.S. PATENT DOCUMENTS

| | | | |
|---|---|---|---|
| 3,736,173 | A | 5/1973 | Okada et al. |
| 4,857,257 | A | 8/1989 | Chen et al. |
| 4,900,792 | A | 2/1990 | Chen et al. |
| 2004/0062942 | A1 | 4/2004 | Lustiger et al. |
| 2005/0215719 | A1 | 9/2005 | Lustiger et al. |
| 2014/0213696 | A1 | 7/2014 | Martin et al. |
| 2014/0288255 | A1 | 9/2014 | Martin et al. |

FOREIGN PATENT DOCUMENTS

| | | | | |
|---|---|---|---|---|
| CA | 1230271 | A | 12/1987 | |
| EP | 0134405 | A2 * | 3/1985 | ............ C08F 255/02 |
| EP | 0134405 | A2 | 3/1985 | |
| EP | 0134405 | A2 | 3/1985 | |
| JP | S6011541 | A | 1/1985 | |
| JP | 2000143893 | A | 5/2000 | |
| JP | 2008-024769 | A1 * | 2/2008 | |
| JP | 2008024769 | A | 2/2008 | |
| JP | 2008544039 | A | 12/2008 | |
| RU | 2249013 | C1 | 3/2005 | |
| RU | 2448121 | C1 | 4/2012 | |
| WO | WO2013076700 | A1 | 5/2013 | |
| WO | WO2013134430 | A1 | 9/2013 | |

OTHER PUBLICATIONS

JP2008-024769A—machine translation (Year: 2008).*
International Search Report and Written Opinion for PCT/IB2016/055067 dated Nov. 24, 2016, 12 pages.
Russian Office Action (Translation in English is provided), 4 pages.
Russian Search Report (Translation in English is provided), 2 pages.
Office Action for Japanese Patent Application 2017-565086 dated May 12, 2020, 6 pages (translation included within document).
Office Action for Indian Patent Application 201817007931 dated May 14, 2020, 6 pages (translation included within document).

* cited by examiner

*Primary Examiner* — Ronald Grinsted
(74) *Attorney, Agent, or Firm* — Praedcere Law

(57) ABSTRACT

Polyethylene powder comprising at least one additive having: Melt Flow Index (MFI), measured at 190° C. with a load of 2.16 kg in accordance with standard ISO 1133-1:2011, ranging from 0.1 g/10 minutes to 100 g/10 minutes, preferably ranging from 5 g/10 minutes to 35 g/10 minutes; density ranging from 0.890 g/cm$^3$ to 0.965 g/cm$^3$, preferably ranging from 0.940 g/cm$^3$ to 960 g/cm$^3$; bulk density ranging from 0.35 g/cm$^3$ to 0.60 g/cm$^3$, preferably ranging from 0.40 g/cm$^3$ to 0.50 g/cm$^3$; average particle diameter (d$_{50}$) ranging from 400 μm to 800 μm, preferably ranging from 450 μm to 780 μm. Said polyethylene powder comprising at least one additive can be advantageously used in rotomolding.

14 Claims, No Drawings

POLYETHYLENE POWDER, PROCESS FOR ITS PREPARATION AND ITS USE FOR ROTOMOLDING

The present invention relates to a polyethylene powder comprising at least one additive. More in particular, the present invention relates to a polyethylene powder comprising at least one additive having the following specific values: Melt Flow Index (MFI), density, bulk density, average particle diameter ($d_{50}$), as well as a process for its preparation. Said polyethylene powder comprising at least one additive can be advantageously used in rotomolding.

Therefore, the present invention also relates to the use of said polyethylene powder comprising at least one additive in the rotomolding, as well as the manufactured articles obtained from said rotomolding.

Rotomolding is widely used for molding hollow articles and can be used to mold both small and large containers such as, for example, tanks with a variable capacity, typically ranging from 1 liter to 57000 liters. Said containers are used for the packaging and transport of material, in particular as containers for fluids or solids. Rotomolding can also be used for portable toilets, cases for tools and batteries, light spheres, steam cleaners and scrubbing brushes for the home, toys, containers for waste. Rotomolding is a relatively less expensive and simpler process to be used with respect to other polymer processing procedures and its use is, therefore, increasing.

Current technologies for the production of polyethylene powder for use in the rotomolding of crosslinked polyethylene articles generally envisage mixing one or more polyethylenes, crosslinking agents, co-crosslinking agents, other additives in an extruder, obtaining granules that are subsequently subjected to grinding in order to obtain powders.

For example, American patent U.S. Pat. No. 4,900,792 describes a composition that essentially consists of:
- a polymer selected from ethylene homopolymers and copolymers, or mixtures thereof, said polymers having essentially complete terminal saturation;
- from 0.1 parts by weight to 3.0 parts by weight per 100 parts by weight of the polymer of an organic peroxide as a crosslinking agent; from 0.5 parts by weight to 5 parts by weight, per 100 parts of the polymer, of an allyl co-crosslinking agent selected from the group of dimethylacrylates, trimethylacrylates, divinyl benzene, vinyl toluene, vinyl pyridine, p-quinone dioxime, acrylic acid, cyclohexyl methacrylate, and 1,2-polybutadiene;
- a quantity of a metal compound having one cation selected from Group IIA and IIB of the Periodic Table of the Elements sufficient to neutralize the acid compounds in the polymer; and
- a peroxide scavenger.

The aforementioned composition is extruded in the form of strands that are cut into pellets and then ground in a mill in order to obtain a powder, preferably with particles having a nominal size of less than or equal to 35 mesh, to be used in molding processes, for example in rotomolding.

American patent application US 2005/0215719 describes a polyethylene based composition comprising:
(a) a first polyethylene having a Melt Flow Index (MFI) from 0.4 g/10 minutes to 3.0 g/10 minutes and a density from 0.910 g/cm$^3$ to 0.930 g/cm$^3$; and
(b) a second polyethylene having a Melt Flow Index (MFI) from 10 g/10 minutes to 30 g/10 minutes and a density from 0.945 g/cm$^3$ to 0.975 g/cm$^3$;

wherein said composition has a density from 0.930 g/cm$^3$ to 0.955 g/cm$^3$ and a Melt Flow Index (MFI) from 1.5 g/10 minutes to 12 g/10 minutes, wherein the second polyethylene is present in an amount ranging from 20% by weight to 65% by weight with respect to the total weight of the first and of the second polyethylene, and wherein the first and the second polyethylene have a density difference ranging from 0.030 g/cm$^3$ to 0.048 g/cm$^3$. The aforementioned composition is said to be advantageously usable in rotomolding. For that purpose, said composition is mixed with the desired additives in an extruder, extruded and cut into pellets which are subsequently ground in a mill in order to obtain a powder with particles that typically have an average diameter of 60 mesh (250 µm). Canadian patent 1,230,271 describes a linear low density polyethylene (LLDPE) processed for use in rotomolding comprising granules of linear low density polyethylene (LLDPE), said granules having additives within or on them, characterized in that it is a free flowing powder having a particle size distribution less than 5% by weight wider than 30 mesh and less than 25% by weight finer than 100 mesh and a bulk density at least 20% higher than the bulk density of the corresponding non-processed linear low density polyethylene (LLDPE). Said processed linear low density polyethylene (LLDPE) can be obtained through a process comprising mixing said additives with a linear low density polyethylene (LLDPE) having a particle size distribution ranging from about 5 mesh to about 200 mesh and a bulk density ranging from about 20 pounds/cubic foot to about 32 pounds/cubic foot, in an intensive mixer until at least 80% of the granules of linear low density polyethylene (LLDPE) is about 30 mesh smaller and the bulk density is at least 20% higher.

Japanese patent JP 501,087 describes the following processes: (i) a first process comprising the addition of a liquid crosslinking agent to a powder or to granules of polyolefin (the polyolefin and the crosslinking agent may have been heated to a temperature above room temperature and below the melting point of the polyolefin, for example, since the melting point of dicumyl peroxide which is frequently used as a crosslinking agent is 39° C., dicumyl peroxide is easily liquefied when heated to a slightly higher temperature), or (ii) a second process comprising the addition of a crosslinking agent in powder form together with a liquid ligand, such as polyisobutylene or polybutene with low molecular weight to a powder or granules of polyolefin, mixing the resulting mixture using a tumbler drum, a mixer, or the like, allowing the crosslinking agent to adhere to the surface of the powder or of the granules of polyolefin in the case of the first process (i), or allowing the crosslinking agent in powder form to adhere to the surface of the powder or of the granules of polyolefin through the liquid ligand in the case of the second process (ii), and in both cases allowing a small portion of the crosslinking agent to penetrate into the powder or into the granules of polyolefin.

American patent U.S. Pat. No. 3,736,173 describes a process for preparing crosslinkable polyolefin granules containing a crosslinking agent, characterized by its capacity to retain said crosslinking agent and to be easily fed through mechanical or pneumatic transfer equipment, comprising:
(a) shaking a mixture of liquid or liquefied crosslinking agent and granules of polyolefin having an average size of at least 0.5 mm in a mixing chamber equipped with a mixer;
(b) distributing said crosslinking agent onto the surfaces of said granules and allowing said crosslinking agent to penetrate and diffuse into said granules activating said mixer at a speed higher than about 7 meters per second; (c) proceeding with the mixing for a sufficient amount of time to reduce the residual quantity of crosslinking agent on the surface of said polyolefin granules to 0.5 parts by weight or less per hundred parts by weight of polyolefin granules; and (d) recovering the polyolefin granules obtained.

However, the above-described processes may imply some drawbacks. For example, in the event of using the extruder, its internal temperature must be carefully kept under control so as not to cause the decomposition of the crosslinking agent (for example, dicumyl peroxide) which would enormously increase the molecular weight of the polyolefin leading to the extruder itself getting blocked. The temperature control inside the extruder generally takes place through the appropriate choice of the screw profile and of the rheology of the polymer used, generally a polyolefin (i.e. through the appropriate choice of its Melt Flow Index—MFI). The screw profile must guarantee the complete melting of the polymer, good dispersion of the crosslinking agent and of the optional additives contained in the polymer and a high hourly flow rate; the polymer must have a rheology (i.e. a Melt Flow Index—MFI) able to guarantee a sufficient hourly extrusion flow rate and low pressures in the nozzle area. Generally, the polymers used and commercially available have a Melt Flow Index (MFI) greater than 15 g/10' (190° C.-2.16 kg) so as to limit the development of heat and to reach hourly flow rates compatible with the production costs. Furthermore, the mixture leaving the extruder must be ground, since it is not possible to obtain a powder of the appropriate dimensions for rotomolding directly from extrusion. The use of nozzles with micrometric holes for obtaining polymer powders is not practical due to the high temperatures generated in this type of nozzles which would cause the decomposition of the crosslinking agent. In the event of using intensive mixers, on the other hand, there is high energy consumption and therefore increased process costs.

The Applicant therefore set out to solve the problem of finding a polyethylene powder comprising at least one additive that can be advantageously used in rotomolding. The Applicant has now found that a polyethylene powder comprising at least one additive having the following specific values of: Melt Flow Index (MFI), density, bulk density, average particle diameter ($d_{50}$), can be advantageously used in rotomolding. In particular, the Applicant has found that said polyethylene powder comprising at least one additive may be obtained by solid phase adsorption (i.e. by adsorption of said at least one additive by the polyethylene particles thanks to their particular porosity, operating at low temperature (i.e. at a temperature of less than or equal to 50° C.), of one or more solutions comprising at least one additive, through the use of specific mixers for solids such as, for example, screw reactors, reactors equipped with a mechanical stirrer (for example, mechanical anchor stirrer), turbomixers, which can operate at low rotation speed (i.e. at a rotation speed of less than or equal to 100 rpm). The possibility to operate at low temperature and low speed allows energy savings which can be estimated as being equal to about 300 kJ/kg of polyethylene powder comprising at least one additive, in addition to the saving obtained by avoiding extrusion and subsequent grinding, which can be estimated as being equal to about 200-300 euros per metric ton. Therefore, the subject matter of the present invention relates to a polyethylene powder comprising at least one additive having:

Melt Flow Index (MFI), measured at 190° C. with a load of 2.16 kg in accordance with standard ISO 1133-1: 2011, ranging from 0.1 g/10 minutes to 100 g/10 minutes, preferably ranging from 5 g/10 minutes to 35 g/10 minutes;

density ranging from 0.890 g/cm$^3$ to 0.965 g/cm$^3$, preferably ranging from 0.940 g/cm$^3$ to 0.960 g/cm$^3$;

bulk density ranging from 0.35 g/cm$^3$ to 0.60 g/cm$^3$, preferably ranging from 0.40 g/cm$^3$ to 0.50 g/cm$^3$;

average particle diameter ($d_{50}$) ranging from 400 μm to 800 μm, preferably ranging from 450 μm to 780 μm.

For the purpose of the present description and of the following claims, the definitions of the numeric ranges always include the extremes unless specified otherwise.

For the purpose of the present description and of the following claims, the term "comprising" also includes the terms "which essentially consists of" or "which consists of". The density of the aforementioned polyethylene was determined in accordance with standard ISO 1183-1:2004.

The bulk density was determined in accordance with standard ASTM D 1895-96.

The average particle diameter ($d_{50}$) (i.e. diameter of at least 50% by volume of the particles) was determined using the Mastersizer 2000 laser particle size analyzer made by Malvern.

For the purpose of the present invention polyethylene obtained through gas-phase (co)polymerization can be used.

For example, for the purpose of the present invention, said polyethylene may be obtained through gas-phase (co)polymerization comprising gas-phase (co)polymerization of ethylene in a reactor and, optionally, at least one α-olefin selected from propylene, 1-butene, 1-pentene, 1-hexene, 1-octene, 3-methyl-1-pentene, 4-methyl-pentene, 4-methyl-1-pentene, preferably in presence of propylene, 1-butene or 1-hexene, in presence of at least one Ziegler-Natta catalyst and of at least one aluminum alkyl compound as a co-catalyst. Ziegler-Natta catalysts are, typically, halides of transition metals belonging to Groups IV-VIII of the Periodic Table of the Elements made to react with alkyl derivatives or hydrides of metals belonging to Groups I-Ill of the Periodic Table of the Elements. Examples of Ziegler-Natta catalysts comprise those based on reaction products of aluminum and magnesium alkyls with titanium tetrahalides. It has to be noted that for the purpose of the present invention and of the following claims, the term "Periodic Table of the Elements" refers to the "IUPAC Periodic Table of the Elements", version dated 1 May 2013, available on the following website: www.iupac.orq/fileadmin/user upload/news/IUPAC Periodic Table-1Jun12.pdf.

Said Ziegler-Natta catalysts may or may not be supported on silica, magnesium chloride, or other fine grain porous materials. Generally, it is preferable to use catalysts supported on silica, in suspension. Preferred Ziegler-Natta catalysts have an average particle diameter ($d_{50}$), in the range from about 10 μm to about 60 μm, in particular from about 15 μm to about 40 μm, for example from about 15 μm to about 35 μm. Ziegler-Natta catalysts having an average particle size diameter less than about 15 μm generally require excessively long (co)polymerization times for producing particles of polyethylene having the desired average diameter ($d_{50}$), whereas Ziegler-Natta catalysts having an average particle diameter over about 60 μm tend to break up during storage, feeding and (co)polymerization with a strong negative impact on the desired particle size distribution of the particles of polyethylene throughout the whole production process.

Prior to its introduction into the (co)polymerization reactor, the Ziegler-Natta catalyst may generally be combined with at least one aluminum alkyl, preferably by suspending the solid catalyst in an organic solvent and subsequently placing the catalyst in contact with the aluminum alkyl. Examples of aluminum alkyls that can be advantageously used for the purpose are: tri-iso-butylaluminum; tri-n-hexylaluminum; tri-ethyl-aluminum; iso-prenylaluminum; alluminoxanes; aluminum compounds containing halogens such as, for example, chloro-diethyl aluminum, dichloro-ethyl aluminum; or mixtures thereof; preferably tri-iso-butylaluminum, tri-ethylaluminum, chloro-di-ethylaluminum, di-chloroethylaluminum; or mixtures thereof. Generally, if the main component of the Ziegler-Natta catalyst is a compound containing titanium, the quantity of aluminum alkyl used is such as to provide an atomic ratio between the aluminum present in the aluminum alkyl and the titanium present in the Ziegler-Natta catalyst ranging from about 0.001:1 to about 200:1, preferably ranging from about 0.1:1 to about 80:1. Furthermore, generally, a co-catalyst is added to the (co)polymerization reactor, such as, for example, tri-methylaluminum, tri-iso-butylaluminum, tri-ethylaluminum, iso-prenylaluminum, aluminoxanes, aluminum compounds containing halogens, or mixtures thereof, preferably tri-iso-butylaluminum, tri-ethylaluminum, or iso-prenylaluminum. Generally, if the main component of the Ziegler-Natta catalyst is a compound containing titanium, the quantity of co-catalyst used is such as to provide, in the (co) polymerization reactor, a ratio between the aluminum present in the aluminum alkyl and the titanium present in the Ziegler-Natta catalyst ranging from about 1:1 to about 800:1, preferably ranging from about 5:1 to about 500:1.

Said gas-phase (co)polymerization may be carried out at a temperature ranging from about 30° C. to about 130° C., preferably ranging from 100° C. to 120° C., and however at a lower temperature than the melting point of the (co)polymer to be obtained, at a partial pressure of ethylene ranging from 500 KPa to 2000 KPa, preferably ranging from 800 KPa to 1200 KPa, and at a α-olefin/ethylene molar ratio preferably ranging from 0.010 to 0.55, preferably ranging from 0.015 to 0.20, according to the density of the (co)polymer obtained and to the type of α-olefin used.

Said gas-phase (co)polymerization may be carried out in the absence of a solvent or, more preferably, in the presence of at least one organic solvent. Organic solvents useful for the purpose are, for example, butane, pentane, hexane, cyclohexane, or mixtures thereof. Said gas-phase (co)polymerization may be carried out discontinuously or continuously in one or more phases. The molecular weight of the polyethylene may be controlled by feeding hydrogen into the (co)polymerization reactor. Generally, the quantity of hydrogen added is such that in the feed to the reactor the hydrogen/ethylene molar ratio is preferably ranging from 0.10 to 1.0, preferably ranging from 0.20 to 0.80. For the purpose of controlling the reactivity of the catalyst used and to improve the heat exchange in the (co)polymerization reactor, dry nitrogen may be added.

The average diameter ($d_{50}$) of the particles of polyethylene may be controlled through the yield of polyethylene with respect to the fed catalyst. The bulk density of the polyethylene may also be controlled by the type of pre-treatment of the Ziegler-Natta catalyst with alkyl aluminum, by the ratio between co-catalyst and Ziegler-Natta catalyst and by the residence time in the (co)polymerization reactor.

Said gas-phase (co)polymerization is generally carried out for a time ranging from about 1 hour to about 12 hours, preferably ranging from about 2 hours to about 9 hours. The total consumption of the Ziegler-Natta catalyst in said gas-phase (co)polymerization is generally ranging from about 0.01 mmoles to about 1 mmoles of titanium, preferably ranging from about 0.02 mmoles to about 0.8 mmoles of titanium per kilogram of polyethylene.

Said (co)polymerization may be carried out in a single phase or in several steps. For example, for producing a polyethylene with a bimodal molecular weight distribution, it is preferable to produce the fraction with the higher molecular weight in a first phase, optionally followed by a second phase for producing the fraction with a lower molecular weight.

At the end of the aforementioned gas-phase (co)polymerization, a polyethylene powder is obtained which is recovered and subjected to treatments known in the prior art, such as degassing, washing and subsequently cooling under a flow of cold nitrogen. Solvents with a high boiling point which may be contained can be removed by distillation through steam. Optionally, salts of long chain fatty acids can be added to the polyethylene powder obtained from the gas-phase (co)polymerization as stabilizers: typical examples of said salts are calcium stearate, magnesium stearate, zinc stearate.

At the end of the aforementioned gas-phase (co)polymerization, the polyethylene powder obtained can be directly used in the process for the preparation of the polyethylene powder comprising at least one additive according to the present invention, or may undergo a pre-treatment through a vibrating screen for the purpose of removing any foreign bodies or large particles deriving from the gas-phase (co) polymerization process in the industrial reactor (for example, powder aggregates with millimetric particle size of melted and recrystallized non-porous polymer). The pre-treatment with a vibrating screen may also be carried out to improve and refine the particle size distribution of the polyethylene powder obtained.

In accordance with a preferred embodiment of the present invention, said polyethylene is a high density polyethylene (HDPE) obtained by gas-phase (co)polymerization.

In accordance with a preferred embodiment of the present invention, said additive can be selected, for example, from: antioxidants, crosslinking agents, co-crosslinking agents, peroxide scavengers, UV-absorbers, light stabilizers.

In accordance with a preferred embodiment of the present invention, said antioxidants may be selected, for example, from sterically hindered phenols such as, for example, 2,6-di-t-butyl-4-methylphenol, 2,6-di-t-butyl-4-nonyl-phenol, 2,2'-methylene-bis-(4-methyl-6-t-butyl-phenol), 4,4'-butylidene-bis-(2-t-butyl-5-methyl-phenol), 4,4'-thio-bis-(2-t-butyl-5-methyl-phenol), 2,2'-thio-bis(6-t-butyl-4-methyl-phenol), 2,5-di-t-amyl-hydroquinone, polymeric sterically hindered phenols, tris-(3,5-di-t-butyl-4-hydroxybenzyl)isocyanurate, 2,2'-thiodiethyl bis-(3,5-di-t-butyl-4-hydroxyphenyl)propionate, 1,1,3-tris-(2'-methyl-4'-hydroxy-5'-t-butyl-phenyl)butane, 2,2'-methylene-bis-6-(1-methylcyclohexyl)-para-cresol, 3,4-dihydro-2,5,7,8-tetramethyl-2-(4,8,12-trimethyltridecyl)-2H-1-benzopyran-6-ol, 2,4-dimethyl-6-(1-methyl-cyclohexyl)phenol, N,N'-hexamethylene bis-(3,5-di-t-butyl-4-hydroxy-hydrocynnamamide), alkyl esters $C_3$-$C_{15}$ of 3,5-bis(1,1-dimethyl)-4-hydroxy-benzenepropanoic acid, or mixtures thereof; organic phosphites such as, for example, tris-(2,4-di-t-butyl-phenyl)phosphite, tris-2,4-bis(1,1-dimethylpropyl)phenylphosphite, tris-4-(1,1-dimethylpropyl)phenyl-phosphite, bis-[2,4-bis(1,1-dimethylpropyl)phenyl][4-(1,1-dimethylpropyl)phenyl]phosphite, [2,4-bis(1,1-dimethylpropyl)phenyl]bis[4-(1,1-dimethylpropyl)phenyl] phosphite, bis[tris-(2,4-di-t-butyl-phenyl)phosphite plus distearyl-3,3-thiodipropionate (about 3% by weight on the weight of the phosphite), bis-(2,4-di-t-butyl-phenyl) pentaerythritol-diphosphite, tetrakis-(2,4-di-t-butyl-phenyl)-4,4'-biphenylene-diphosphonite, tris-(p-nonylphenyl)phosphite, di-iso-decyl-phenyl-phosphite, diphenyl-iso-decyl-phosphite, tri-iso-decyl-phosphite, trilauryl-phosphite, or mixtures thereof; organic phosphonates; organic phosphonites; organic phosphates such as di(stearyl)pentaerythritol diphosphite, tetrakis(2,4-di-t-butylphenyl)-4,4'-biphenylene-diphosphonite, or mixtures thereof; antioxidants based on vitamins such as, for example, antioxidants based on vitamin E; or mixtures thereof.

Specific examples of antioxidants that may be advantageously used for the purpose of the present invention and that are currently commercially available are: Anox® 1315 by Addivant (sterically hindered phenol), Weston® 705 by Addivant (phosphite), Irgafos® 168 by Basf (phosphite), Irganox® E 201 by Basf (antioxidant based on vitamin E).

In accordance with a preferred embodiment of the present invention, said crosslinking agents may be selected, for example, from organic peroxides, preferably from organic peroxides having general formula (I):

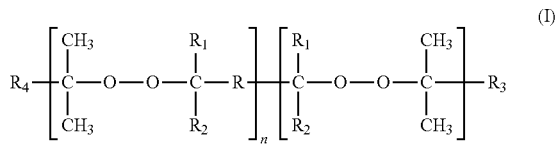

wherein:
R is a divalent hydrocarbon group, preferably selected from:

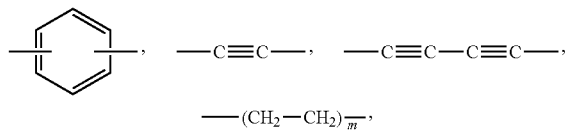

wherein m represents a number ranging from 1 to 8;
$R_1$ and $R_2$, mutually identical or different, represent a linear or branched $C_1$-$C_{12}$ alkyl group, preferably $C_1$-$C_6$;
$R_3$ and $R_4$, mutually identical or different, represent a linear or branched $C_1$-$C_{12}$ alkyl group, preferably $C_1$-$C_6$;
n is 0 or 1.

In accordance with a particularly preferred embodiment of the present invention, said organic peroxides having general formula (I) may be selected, for example, from: bis(alkylperoxy)alkanes such as, for example, 2,5-bis(t-amylperoxy)-2,5-dimethylhexane, 2,5-bis(t-butylperoxy)-2,5-dimethylhexane, 3,6-bis(t-butylperoxy)-3,6-dimethyloctane, 2,7-bis(t-butylperoxy)-2,7-dimethyl-octane, 8,11-bis(t-butylperoxy)-8,11-dimethyloctadecane, or mixtures thereof; bis(alkylperoxy)benzenes such as, for example, α,α'-bis(t-amylperoxy-iso-propyl)benzene, α,α'-bis(t-butylperoxy-iso-propyl)benzene, or mixtures thereof; bis(alkylperoxy) acetylenes such as, for example, 2,7-dimethyl-2,7-di(t-butyl peroxy)octadiyne-3,5,2,7-dimethyl-2,7-di(peroxyethylcarbonate)octadiyne-3,5,3,6-dimethyl-3,6-di(peroxyethylcarbonate)octyne-4, t-butyl-peroxybenzoate, 3,6-dimethyl-3,6-di(t-butylperoxy)octyne-4,2,5-dimethyl-2,5-di(peroxy-n-propyl-carbonate)hexyne-3,2,5-dimethyl-2,5-di(peroxy-iso-butyl carbonate)hexyne-3,2,5-dimethyl-2,5-di(peroxyethyl-carbonate)hexyne-3,2,5-dimethyl-2,5-di(α-cumyl-peroxy) hexyne-3,2,5-dimethyl-2,5-di(t-butylperoxy)hexyne-3, or mixtures thereof; or mixtures thereof. 2,5-Dimethyl-2,5-di(t-butylperoxy)hexyne-3 is particularly preferred.

Examples of organic peroxides that can be used in the present invention and that are currently commercially available are the products Trigonox® 145-E85, Trigonox® C, Trigonox® 101, by Akzo Nobel.

In accordance with a preferred embodiment of the present invention, said co-crosslinking agents can be selected, for example, from allyl compounds, preferably from: allyl methacrylate, diallyl itaconate, diallyl phthalate, triallyl trimellitate, triallyl trimetallil trimellitate, triallyl cyanurate (TAC), triallyl iso-cyanurate (TAIC), triallyl phosphate, or mixtures thereof. Triallyl cyanurate (TAC) is particularly preferred.

Examples of allyl compounds that can be used in the present invention and that are currently commercially available are the products Luvomaxx® TAC by Lehvoss, TAC by Evonik.

In accordance with a preferred embodiment of the present invention, said peroxide scavengers may be selected, for example, from compounds containing sulfur such as, for example, esters of β-thiodipropionic acid such as, for example, stearyl, myristyl, tridecyl esters, or mixtures thereof; mercaptobenzoimidazole or zinc salts of 2-mercaptobenzimidazole, or mixtures thereof; dibutylthiodicarbamate zinc; dioctadecyl disulfide; pentaerythritol tetrakis(β-dodecylmercapto)propionate; or mixtures thereof.

In accordance with a preferred embodiment of the present invention, said UV absorbers can be selected, for example, from: triazines, benzooxaazinones, benzotriazoles, benzophenones, benzoates, formamidine, cinnamates or propenoates, aromatic propandiones, benzoimidazoles, cycloaliphatic ketones, formanilides including the oxamides, cyanoacrylates, benzopiranones, salicylates, or mixtures thereof.

Specific examples of UV absorbers that can be used in the present invention and that are currently commercially available are the products Chimassorb® 81 by Basf (benzophenone), Ciba® Tinuvin® 326 by Ciba (benzotriazole).

In accordance with a preferred embodiment of the present invention, said light stabilizers can be selected, for example, from sterically hindered amines.

Sterically hindered amines that can be used in the present invention and that are currently commercially available are the products Ciba® Tinuvin® 622 by Ciba (oligomeric sterically hindered amine), Ciba® Chimassorb® 944 by Ciba (oligomeric sterically hindered amine).

The polyethylene powder comprising at least one additive according to the present invention may optionally contain further additives commonly used in crosslinkable compositions based on polyethylene, in particular in the crosslinkable compositions based on polyethylene used in rotomolding such as, for example: fillers such as, for example, carbon black, clay, talc, calcium carbonate, or mixtures thereof; blowing agents; nucleating agents for blown systems; lubricants; dyes; metal deactivators, coupling agents.

The type of additives used and the final quantity of additives present in said polyethylene powder depend on the final desired manufactured article. Preferably, the total quantity of additives present, may be ranging from 0.05 parts by weight to 1 part by weight, preferably ranging from 0.1 parts by weight to 0.5 parts by weight, with respect to 100 parts by weight of polyethylene powder.

As mentioned above, the polyethylene powder comprising at least one additive according to the present invention, may be obtained by solid phase adsorption (i.e. by adsorption of said at least one additive by the polyethylene particles thanks to their special porosity), at low temperature (i.e. at temperature less than or equal to 50° C.) and at low rotation speed (i.e. at rotation speed less than or equal to 100 rpm), of one or more solutions comprising at least one additive.

Therefore, a further object of the present invention is a process for preparing a polyethylene powder comprising at least one additive, having the aforementioned characteristics, said process comprising:

preparing a solution comprising at least one additive, operating at a temperature ranging from 25° C. to 50° C., preferably ranging from 30° C. to 40° C., at a rotation speed ranging from 1 rpm to 100 rpm, preferably ranging from 20 rpm to 80 rpm, for a time ranging from 10 minutes to 50 minutes, preferably ranging from 15 minutes to 45 minutes;

adding said solution to at least one polyethylene powder obtained through gas-phase (co)polymerization, and maintaining the whole under stirring, at a rotation speed ranging from 10 rpm to 100 rpm, preferably ranging from 30 rpm to 70 rpm, at a temperature ranging from 25° C. to 50° C., preferably ranging from 30° C. to 40° C., for a time ranging from 10 minutes to 60 minutes, preferably ranging from 15 minutes to 50 minutes.

Said process can be carried out using mixers that can operate at low rotation speed known in the prior art such as, for example, screw reactors, reactors equipped with a mechanical stirrer (for example, anchor mechanical mixer), turbomixers.

Said solution comprising at least one additive may be added to said polyethylene powder through injection systems and nebulization or sprinkle dispersion systems, for example through spray nozzles, in one or more phases, preferably in one phase. Preferably, the addition takes place in a time ranging from 5 to 20 minutes, more preferably ranging from 8 to 15 minutes.

For the purpose of preparing the aforementioned solution comprising at least one additive, said at least one additive can be used as such if it is in liquid form, or in solution with other additives if it is in solid form. Generally, additives in solid form may be solubilized with other additives in liquid form, through thermally heated stirrers and, if necessary, using appropriate solvents that must not however interfere with the crosslinking or with the properties of the final desired manufactured articles.

In the event that a solvent needs to be added in the amount of a few percent by weight, preferably in the amount of less than or equal to 3% by weight, preferably less than or equal to 1% by weight, with respect to the total weight of the solution (additive(s)+solvent), to dissolve one or more additives, a solvent must be used that has a high vapor tension so that it can be subsequently removed with a flow of air or evaporation under vacuum. Solvents useful for the purpose are, for example, pentane, hexane, or mixtures thereof. In the event of using heat-sensitive additives (for example, peroxides) in solid form, it is necessary to take care not to exceed their self accelerating decomposition temperature (SADT).

Alternatively, additives in solid form, that are not heat-sensitive, may be dissolved even at high temperatures (i.e. at temperatures above their melting point).

At the end of the aforementioned process, the polyethylene powder comprising at least one additive obtained is cooled and can be directly used in rotomolding.

The polyethylene powder comprising at least one additive obtained through the aforementioned process has the following particle size distribution measured using the Mastersizer 2000 laser particle size analyzer made by Malvern:

($d_{10}$), i.e. diameter of at least 10% by volume of the particles, ranging from 180 µm to 380 µm, preferably ranging from 200 µm to 350 µm;

average particle diameter ($d_{50}$), i.e. diameter of at least 50% by volume of the particles, ranging from 400 µm to 800 µm, preferably ranging from 450 µm to 780 µm;

($d_{90}$), i.e. diameter of at least 90% by volume of the particles, ranging from 1000 µm to 1500 µm, preferably ranging from 1050 µm to 1450 µm;

Span, i.e. ($d_{90}$–$d_{10}$)/$d_{50}$, ranging from 1.3 to 1.8, preferably ranging from 1.35 to 1.75.

In the event that solvents are used in quantities above 1% by weight with respect to the total weight of the solution, it may be necessary to carry out a further treatment either in an air flow or under vacuum, always under stirring, in order to remove the solution comprising one or more additives that has not been adsorbed by the polyethylene.

In accordance with a further aspect of the present invention, said polyethylene powder comprising at least one additive is used in rotomolding.

For that purpose, said polyethylene powder comprising at least one additive is placed in a hollow mold which is typically made to turn about two axes and heated inside an oven. Said polyethylene powder comprising at least one additive is heated for a sufficient time and at a sufficient temperature to melt the polyethylene during the rotomolding. However, the time and temperature used depend on many factors such as the thickness of the articles to be obtained through rotomolding and the temperature sensitivity of the various additives contained in the polyethylene powder comprising at least one additive used: a person skilled in the art will however be able to decide on the most suitable process conditions. For example, with regard to the polyethylene powder in accordance with the present invention, it is possible to operate under the following conditions: thickness of about 0.3 cm, oven temperature ranging from 220° C. to 290° C., time ranging from 10 minutes to 20 minutes.

In accordance with a further aspect, the present invention also relates to the manufactured articles obtained through the rotomolding of the aforementioned polyethylene powder comprising at least one additive.

Examples of manufactured articles that can be obtained through rotomolding are: petrol tanks, large waste containers, large drums or silos for fertilizers.

For the purpose of understanding the present invention better and to put it into practice, below are some illustrative and non-limitative examples thereof.

EXAMPLE 1 (COMPARATIVE)

9.8 kg of high density polyethylene (HDPE) (Eraclene® MR 80 U by Versalis spa) in granular form, having the following characteristics:

Melt Flow Index (MFI), measured at 190° C. with a load of 2.16 kg in accordance with ISO 1133-1: 2011, of 25 g/10 minutes;

density of 0.954 g/cm$^3$, 0.72 kg of 2,5-dimethyl-2,5-di(t-butylperoxy)hexyne-3 (Trigonox® 145-E85 by Akzo Nobel) and 0.88 kg of triallyl cyanurate(TAC) (Luvomaxx® TAC by Lehvoss), were placed in a laboratory screw mixer, at a temperature of 25° C., for 20 minutes, at a mixing speed of 60 rpm. At the end, the crosslinkable composition obtained was unloaded from the internal mixer and fed to a co-rotating twin-screw extruder (D=30 mm; L/D=28) and extruded at a temperature profile not exceeding 145° C., at a flow rate of 7.5 kg/h, and at a screw rotation speed of 100 rpm. The material extruded in "spaghetti" form was cooled in a water bath, dried in air, granulated using a chopper and then subjected to grinding in a mill with rotating blades, obtaining a powder with average particle diameter ($d_{50}$) of 353 μm and a dry flow index of 32 seconds.

The mechanical properties of the polyethylene powder were measured. For that purpose, samples of said polyethylene powder obtained by compression molding at 200° C., at a pressure of 5000 kg/cm$^2$, for 20 minutes, having 3.2 mm thickness, 150 mm height and 150 mm width, were subjected to the following measurements:
- yield stress in accordance with standard ASTM D638-03;
- stress at break in accordance with standard ASTM D638-03;
- elongation at break in accordance with standard ASTM D 638-03;
- ball drop test in accordance with standard ASTM D2463-15, at 20° C.;
- content of gel measured by weight loss, after 8 hours, in ethylbenzene at reflux;
- dry flow index in accordance with standard ASTM D1895-96(2010)e1.

The results obtained are shown in Table 1. Table 1 also shows the dry flow index and the gel content.

EXAMPLE 2 (INVENTION)

In a fluidized bed reactor, a polyethylene powder was prepared, in the gas-phase, by mixing ethylene at a partial pressure of 880 kPa, hydrogen at a partial pressure suitable to obtain a hydrogen/ethylene molar ratio of 0.66, 1-hexene at a partial pressure suitable for obtaining a 1-hexene/ethylene molar ratio of 0.019:dry nitrogen was also fed into said reactor for the purpose of reaching a total pressure of 2000 kPa. The reactor was brought to 110° C. and subsequently the catalyst UCAT™-A by Univation Technologies and tri-iso-butylaluminum by Aldrich was fed into it, and the whole was kept, at said total pressure and at said temperature, for a time ranging from 2.5 hours to 3.5 hours. The polyethylene powder was unloaded continuously, passed into an automatic degassing and washing system and then left to cool in a container under a flow of cold nitrogen.

34 g of 2,5-dimethyl-2,5-di(t-butylperoxy)hexyne-3 (Trigonox® 145-E85 by Akzo Nobel), 5 g of sterically hindered phenol (Anox® 1315 by Addivant) and 8 g of phosphite (Weston® 705 by Addivant) were loaded into a 0.5 liter flask, equipped with a magnetic stirrer: the mixture was heated, under stirring at 50 rpm, to 38° C. After reaching said temperature, 41 g of triallyl cyanurate (crystalline solid) (TAC) (Luvomaxx® TAC by Lehvoss) and 28 g of Chimassorb® 81 (benzophenone) (in powder) (Basf) were added: the mixture was kept, under stirring at 50 rpm, at 38° C., until complete dissolution of all the components (about 40 minutes). The faded yellow color solution obtained was left to cool to ambient temperature (25° C.) and then added to the polyethylene powder operating as described below.

4.4 kg of the polyethylene powder obtained as described above were introduced into a jacketed reactor equipped with a magnetic stirrer and, in 10 minutes, through spray nozzles, the aforementioned solution: the whole was kept under stirring at 60 rpm, for 45 minutes, at a temperature of 35° C. At the end, the reactor was left to cool to ambient temperature (25° C.) and the polyethylene powder comprising the additives was unloaded. Said polyethylene powder was found to have the following characteristics:
- Melt Flow Index (MFI), measured at 190° C. with a load of 2.16 kg in accordance with ISO 1133-1: 2011, of 27 g/10 minutes;
- density of 0.954 g/cm$^3$,
- bulk density of 0.44 g/cm$^3$;
- ($d_{10}$) of 207 μm;
- average particle diameter ($d_{50}$) of 518 μm;
- ($d_{90}$) of 1082 μm;
- Span of 1.69;
- dry flow index of 16 seconds.

The mechanical properties of the polyethylene powder obtained were measured, operating as specified in Example 1. The results obtained are shown in Table 1. Table 1 also shows the dry flow index and the gel content measured as described above.

EXAMPLE 3 (INVENTION)

In a fluidized bed reactor, a polyethylene powder was prepared, in gas-phase, by mixing ethylene at a partial pressure of 880 kPa, hydrogen at a partial pressure suitable to obtain a hydrogen/ethylene molar ratio of 0.30:dry nitrogen was also fed into said reactor for the purpose of reaching a total pressure of 2000 kPa. The reactor was brought to 108° C. and subsequently the catalyst UCAT™-A by Univation Technologies and tri-iso-butylaluminum by Aldrich was fed into it, and the whole was kept, at said total pressure and at said temperature, for a time ranging from 2.5 hours to 3.5 hours.

The polyethylene powder was unloaded continuously, passed into an automatic degassing and washing system and then left to cool in a container under a flow of cold nitrogen.

34 g of 2,5-dimethyl-2,5-di(t-butylperoxy)hexyne-3 (Trigonox® 145-E85 by Akzo Nobel), 5 g of sterically hindered phenol (Anox® 1315 by Addivant) and 8 g of phosphite (Weston® 705 by Addivant) were loaded into a 0.5 liter flask, equipped with a magnetic stirrer: the mixture was heated, under stirring at 50 rpm, to 38° C. After reaching said temperature, 41 g of triallyl cyanurate (crystalline solid) (TAC) (Luvomaxx® TAC by Lehvoss) and 28 g of Chimassorb® 81 (benzophenone) (in powder) (Basf) were added: the mixture was kept, under stirring at 50 rpm, at 38° C., until complete dissolution of all the components (about 40 minutes). The faded yellow color solution obtained was left to cool to ambient temperature (25° C.) and then added to the polyethylene powder as described below. 4.4 kg of the polyethylene powder obtained as described above were introduced into a jacketed reactor equipped with a magnetic stirrer and, in 10 minutes, through spray nozzles, the aforementioned solution: the whole was kept under stirring at 60 rpm, for 45 minutes, at a temperature of 35° C.

At the end, the reactor was left to cool to ambient temperature (25° C.) and the polyethylene powder comprising the additives was unloaded. Said polyethylene powder had the following characteristics:
- Melt Flow Index (MFI), measured at 190° C. with a load of 2.16 kg in accordance with ISO 1133-1: 2011, of 9 g/10 minutes;
- density of 0.959 g/cm$^3$,
- bulk density of 0.47 g/cm$^3$;
- ($d_{10}$) of 320 μm;
- average particle diameter ($d_{50}$) of 765 μm;
- ($d_{90}$) of 1360 μm;
- Span of 1.408;
- dry flow index of 14 seconds.

The mechanical properties of the polyethylene powder obtained were measured, operating as specified in Example 1. The results obtained are shown in Table 1. Table 1 also shows the dry flow index and the gel content measured as described above.

TABLE 1

| Mechanical properties | Example 1 (comparison) | Example 2 (invention) | Example 3 (invention) |
|---|---|---|---|
| Yield stress (MPa) | 18.5 | 17.8 | 19.2 |
| Stress at break (MPa) | 13.0 | 13.6 | 13.0 |
| Elongation at break (MPa) | 205 | 300 | 200 |
| Peak energy (Ball drop) (T = 20° C.) (J) | 32 | n.d.(*) | 36 |
| Total energy (Ball drop) (T = 20° C.) (J) | 51 | n.d.(*) | 58 |
| Maximum peak force (Ball drop) (T = 20° C.) (N) | 4500 | n.d.(*) | 5010 |
| Gel content (%) | 76.5 | 77.5 | 78.5 |
| Dry flow index (sec.) | 32 | 16 | 14 |

(*)n.d.: not determined.

From the data shown in Table 1 it can be inferred that the polyethylene powder comprising at least one additive according to the present invention [Example 2 and Example 3 (invention)] has similar mechanical properties to those of the polyethylene powder comprising the same additives, obtained by mixing in an extruder and subsequent granulation [Example 1 (comparison)] and a better dry flow index.

The invention claimed is:

1. Process for the preparation of a polyethylene powder comprising at least one additive, comprising:
   preparing a solution comprising at least one additive, operating at a temperature ranging from 25° C. to 50° C., at a rotation speed ranging from 1 rpm to 100 rpm, for a time ranging from 10 minutes to 50 minutes;
   adding said solution to at least one polyethylene powder obtained through gas-phase (co)polymerization, and maintaining said solution and said at least one polyethylene powder under stirring, at a rotation speed ranging from 10 rpm to 100 rpm, at a temperature ranging from 25° C. to 50° C., for a time ranging from 10 minutes to 60 minutes.

2. Process for the preparation of a polyethylene powder comprising at least one additive in accordance with claim 1, wherein said polyethylene powder has:
   Melt Flow Index (MFI), measured at 190'C with a load of 2.16 kg in accordance with ISO 1133-1: 2011, ranging from 0.1 g/10 minutes to 100 g/10 minutes;
   density ranging from 0.890 g/cm$^3$ to 0.965 g/cm$^3$;
   bulk density ranging from 0.35 g/cm$^3$ to 0.60 g/cm$^3$;
   average particle diameter ($d_{50}$) ranging from 400 μm to 800 μm.

3. Process for the preparation of a polyethylene powder comprising at least one additive in accordance with claim 1, wherein said polyethylene is a high density polyethylene (HDPE), obtained by gas-phase (co) polymerization.

4. Process for the preparation of a polyethylene powder comprising at least one additive in accordance with claim 1, wherein said additive includes at least one of the following: an antioxidant, a crosslinking agent, a co-crosslinking agent, a peroxide scavenger, a UV-absorber, and a light stabilizer.

5. Process for the preparation of a polyethylene powder comprising at least one additive in accordance with claim 4, wherein said antioxidant includes at least one of the following: 2,6-di-t-butyl-4-methylphenol, 2,6-di-t-butyl-4-nonyl-phenol, 2,2'-methylene-bis-(4-methyl-6-t-butyl-phenol), 4,4'-butylidene-bis-(2-t-butyl-5-methyl-phenol), 4,4'-thio-bis-(2-t-butyl-5-methyl-phenol), 2,2'-thio-bis (6-t-butyl-4-methyl-phenol), 2,5-di-t-amyl-hydroquinone; tris-(3,5-di-t-butyl-4-hydroxybenzyl)isocyanurate, 2,2'-thiodiethyl-bis-(3,5-di-t-butyl-4-hydroxyphenyl)propionate, 1,1,3-tris-(2'-methyl-4'-hydroxy-5'-t-butyl-phenyl)butane, 2,2'-methylene-bis-6-(1-methyl-cyclohexyl)-para-cresol, 3,4-dihydro-2,5,7,8-tetramethyl-2-(4,8,12-trimethyltridecil)-2H-1-benzopyran-6-ol, 2,4-dimethyl-6-(1-methylcyclohexyl)phenol, N,N'-hexamethylene bis-(3,5-di-t-butyl-4-hydroxyhydrocinnamide), $C_3$-$C_{15}$ alkyl esters of 3,5-bis(1,1-dimethyl)-4-hydroxybenzenpropanoic acid, tris-(2,4-di-t-butyl-phenyl)phosphite, tris-2,4-bis(1,1-dimethylpropyl)phenylphosphite, tris-4-(1,1-dimethylpropyl)phenyl-phosphite, bis[2,4-bis(1,1-dimethylpropyl)phenyl][4-(1,1-dimethylpropyl)phenyl]phosphite, [2,4-bis(1,1-dimethylpropyl)phenyl] bis [4-(1,1-dimethylpropyl)phenyl] phosphite, bis [tris (2,4-di-t-butyl-phenyl) phosphite in combination with distearyl-3,3-thiodipropionate, bis-(2,4-di-t-butyl-phenyl)pentaerythritoldiphosphite, tetrakis-(2,4-di-t-butyl-phenyl)-4,4'-biphenylenediphosphonite, tris-(p-nonylphenyl)phosphite, di-iso-decylphenyl phosphite, diphenyl-iso-decyl phosphite, tri-iso-decyl phosphite, trilauryl phosphite, organic phosphonate, organic phosphonite, di(stearyl)pentaerythritol diphosphite, tetrakis(2,4-di-t-butylphenyl)-4,4'-biphenylene-diphosphonite, and an antioxidant based on vitamin E.

6. Process for the preparation of a polyethylene powder comprising at least one additive in accordance with claim 4, wherein said crosslinking agent includes an organic peroxide having general f,

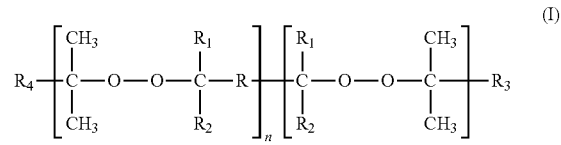

wherein R is a divalent hydrocarbon group, selected from:

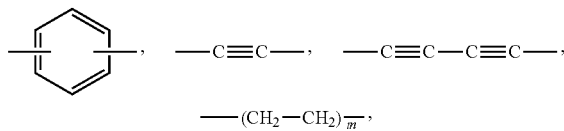

$C_1$-
   wherein m represents a number ranging from 1 to 8;
   $R_1$ and $R_2$, mutually identical or different, represent a linear or branched $C_1$-$C_{12}$ alkyl group;
   $R_3$ and $R_4$, mutually identical or different, represent a linear or branched $C_1$-$C_{12}$ alkyl group;
   n is 0 or 1.

7. Process for the preparation of a polyethylene powder comprising at least one additive in accordance with claim 4, wherein said co-crosslinking agent includes at least one of the following allyl compounds: allyl methacrylate, diallyl itaconate, diallyl phthalate, triallyl trimellitate, triallyl trimethyl trimellitate, triallyl cyanurate (TAC), triallyl iso-cyanurate (TAlC), and triallyl phosphate.

8. Process for the preparation of a polyethylene powder comprising at least one additive in accordance with claim 4, wherein said peroxide scavenger includes at least one of the following: an ester of β-thiodipropionic acid; mercaptobenzoimidazole or a zinc salt of 2-mercaptobenzimidazole; dibutylthiodicarbamate zinc; dioctadecyl disulfide; and pentaerythritol tetrakis (β-dodecylmercapto)propionate.

9. Process for the preparation of a polyethylene powder comprising at least one additive in accordance with claim 4, wherein said UV absorber includes at least one of the following: triazine, benzooxaazinone, benzotriazole, benzophenone, benzoate, formamidine, cinnamate, propenoate, aromatic propandione, benzoimidazole, cycloaliphatic ketone, formanilide, oxamide, cyanoacrylate, benzopiranone and salicylate.

10. Process for the preparation of a polyethylene powder comprising at least one additive in accordance with claim 4, wherein said light stabilizer includes a sterically hindered amine.

11. Process for the preparation of a polyethylene powder comprising at least one additive in accordance with claim 4, wherein said antioxidant includes at least one of the following: sterically hindered phenol, polymeric sterically hindered phenol, a $C_3$-$C_{15}$ alkyl ester of 3,5-bis(1,1-dimethyl)-4-hydroxybenzenpropanoic acid, organic phosphite, organic phosphonate, organic phosphonite, organic phosphate, and an antioxidant based on vitamin E.

12. Process for the preparation of a polyethylene powder comprising at least one additive in accordance with claim 6, wherein said organic peroxide having general formula (I) includes at least one of the following: 2,5-bis(t-amylperoxy)-2,5-dimethylhexane, 2,5-bis(t-butylperoxy)-2,5-dimethylhexane, 3,6-bis(t-butylperoxy)-3,6-dimethyl-octane, 2,7-bis(t-butylperoxy)-2,7-dimethyl-octane, 8,11-bis(t-butylperoxy)-8,11-dimethyloctadecane; α,α'-bis(t-amylperoxy-iso-propyl)benzene, α,α'-bis(t-butylperoxy-iso-propyl) benzene; 2,7-dimethyl-2,7-di(t-butyl peroxy)octadiyne-3,5, 2,7-dimethyl-2,7-di(peroxyethylcarbonate)octadiyne-3,5, 3,6-dimethyl-3,6-di(peroxyethylcarbonate)octyne-4, t-butyl-peroxybenzoate, 3,6-dimethyl-3,6-di(t-butylperoxy)octyne-4, 2,5-dimethyl-2,5-di(peroxy-n-propyl-carbonate) hexyne-3, 2,5-dimethyl-2,5-di(peroxy-iso-butyl carbonate) hexyne-3, 2,5-dimethyl-2,5-di(peroxyethyl-carbonate) hexyne-3, 2,5-dimethyl-2,5-di(α-cumyl-peroxy)hexyne-3, and 2,5-dimethyl-2,5-di(t-butylperoxy)hexyne-3.

13. Process for the preparation of a polyethylene powder comprising at least one additive in accordance with claim 1 comprising:
preparing the solution comprising at least one additive, operating at the temperature ranging from 30° C. to 40° C., at the rotation speed ranging from 20 rpm to 80 rpm, for the time ranging from 15 minutes to 45 minutes; and
adding said solution to the at least one polyethylene powder obtained through gas-phase (co)polymerization, and maintaining said solution and said at least one polyethylene powder under stirring, at the rotation speed ranging from 30 rpm to 70 rpm, at the temperature ranging from 30° C. to 40° C., for the time ranging from 15 minutes to 50 minutes.

14. Process of forming articles by rotomolding comprising
preparing a polyethylene powder comprising at least one additive, comprising:
preparing a solution comprising at least one additive, operating at a temperature ranging from 25° C. to 50° C., at a rotation speed ranging from 1 rpm to 100 rpm for a time ranging from 10 minutes to 50 minutes;
adding said solution to at least one polyethylene powder obtained through gas-phase (co)polymerization, and maintaining said solution and said at least one polyethylene powder under stirring, at a rotation speed ranging from 10 rpm to 100 rpm, at a temperature ranging from 25° C. to 50° C., for a time ranging from 10 minutes to 60 minutes, thereby forming the polyethylene powder comprising the at least one additive;
with the proviso that extrusion and grinding of the polyethylene powder comprising the at least one additive is not carried out; and
adding the polyethylene powder comprising the at least one additive to a mold; and
carrying out rotomolding of the polyethylene powder comprising the at least one additive to form an article.

* * * * *